United States Patent
Biran et al.

(10) Patent No.: US 9,396,009 B2
(45) Date of Patent: Jul. 19, 2016

(54) OPTIMIZED GLOBAL CAPACITY MANAGEMENT IN A VIRTUALIZED COMPUTING ENVIRONMENT

(71) Applicant: International Business Machines Corporation, Armonk, NY (US)

(72) Inventors: Ofer Biran, Haifa (IL); Erez Hadad, Nahariya (IL); Yosef Moatti, Haifa (IL); Sadek Jbara, Taybe (IL); Gil Rapaport, D.N. Gilboa (IL)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 14/168,015

(22) Filed: Jan. 30, 2014

(65) Prior Publication Data

US 2015/0212840 A1    Jul. 30, 2015

(51) Int. Cl.
*G06F 9/455* (2006.01)
*H04L 12/917* (2013.01)
*H04L 12/927* (2013.01)
*H04L 12/911* (2013.01)

(52) U.S. Cl.
CPC ........ *G06F 9/45533* (2013.01); *G06F 9/45558* (2013.01); *H04L 47/76* (2013.01); *H04L 47/80* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 8,433,802 B2 | 4/2013 | Head et al. | |
| 8,464,255 B2 | 6/2013 | Nathuji et al. | |
| 8,468,535 B1 | 6/2013 | Keagy et al. | |
| 8,825,858 B1* | 9/2014 | Atchity | H04L 47/76 709/224 |
| 8,826,274 B2* | 9/2014 | Moriki | G06F 9/45558 718/1 |
| 2009/0249332 A1* | 10/2009 | Hoehle | G06F 9/45558 718/1 |
| 2010/0125844 A1* | 5/2010 | Mousseau | G06F 9/50 718/1 |
| 2011/0119670 A1* | 5/2011 | Sugumar | G06F 9/5088 718/1 |
| 2011/0154333 A1* | 6/2011 | Miyamoto | G06F 9/45533 718/1 |

(Continued)

FOREIGN PATENT DOCUMENTS

WO    2012165937    12/2012

OTHER PUBLICATIONS

Ye et al., "Live Migration of Multiple Virtual Machines with Resource Reservation in Cloud Computing Environments," 2011, 2011 IEEE International Conference on Cloud Computing (CLOUD), pp. 267-274.*

(Continued)

*Primary Examiner* — Thuy Dao
*Assistant Examiner* — Stephen Berman
(74) *Attorney, Agent, or Firm* — Laura E. Gisler

(57) ABSTRACT

Machines, systems and methods for managing resources allocated in a virtualized computing network are provided. The method comprises monitoring resource usage by a first host, wherein the first host, in addition to the first host's dedicated resources, has access to a first set of sharable resources, and wherein the second host, in addition to the second host's dedicated resources, has access to a second set of sharable resources; determining whether the second host has excess resource capacity in the second host's dedicated and sharable resources, in response to determining that resource usage of the first host in the first host's dedicated and sharable resources has exceeded a resource usage threshold; and reallocating one or more resources in the second set of sharable resources from the second host to the first host, in response to determining that the second host has excess resource capacity.

9 Claims, 4 Drawing Sheets

(56) References Cited

U.S. PATENT DOCUMENTS

| | | | |
|---|---|---|---|
| 2011/0191477 A1 | 8/2011 | Zhang et al. | |
| 2011/0296429 A1* | 12/2011 | Segmuller | G06F 21/105 718/104 |
| 2012/0102156 A1* | 4/2012 | Kang | G06F 9/45558 709/219 |
| 2012/0174097 A1* | 7/2012 | Levin | G06F 9/5077 718/1 |
| 2013/0054813 A1* | 2/2013 | Bercovici | G06F 9/45533 709/226 |
| 2013/0067485 A1 | 3/2013 | Shamilian et al. | |
| 2013/0138806 A1 | 5/2013 | Gohad et al. | |
| 2013/0254404 A1* | 9/2013 | Johnsen | G06F 9/45533 709/226 |
| 2014/0075439 A1* | 3/2014 | Wang | G06F 9/45558 718/1 |
| 2014/0108404 A1* | 4/2014 | Chen | G06F 17/30 707/737 |
| 2014/0137110 A1* | 5/2014 | Engle | G06F 9/5022 718/1 |
| 2014/0181806 A1* | 6/2014 | Abiezzi | G06F 9/45558 718/1 |
| 2014/0201732 A1* | 7/2014 | Haag | G06F 9/45533 718/1 |
| 2014/0215465 A1* | 7/2014 | Elzur | G06F 9/45533 718/1 |
| 2014/0258446 A1* | 9/2014 | Bursell | G06F 15/177 709/217 |
| 2015/0163163 A1* | 6/2015 | Kato | H04L 47/76 709/226 |

OTHER PUBLICATIONS

Van et al., "Autonomic virtual resource management for service hosting platforms," 2009, CLOUD '09 Proceedings of the 2009 ICSE Workshop on Software Engineering Challenges of Cloud Computing, pp. 1-8.*

Stage et al., "Network-aware migration control and scheduling of differentiated virtual machine workloads," 2009, CLOUD '09 Proceedings of the 2009 ICSE Workshop on Software Engineering Challenges of Cloud Computing, pp. 9-14.*

Verma et al., "The cost of reconfiguration in a cloud", Middleware Industrial Track '10 Proceedings of the 11th International Middleware Conference Industrial track, pp. 11-16, 2010.

Van et al., "Autonomic virtual resource management for service hosting platforms", CLOUD '09 Proceedings of the 2009 ICSE Workshop on Software Engineering Challenges of Cloud Computing, pp. 1-8.

Goncalves et al., "Dynamic Resource Management in Clouds: A Probabilistic Approach", IEICE Transactions on Communications, vol. E95-B, No. 8, pp. 2522-2529, 2012.

Han et al., "Virtual resource monitoring in cloud computing", Journal of Shanghai University, vol. 15, Issue 5, pp. 381-385, 2011.

* cited by examiner

__OPTIMIZED GLOBAL CAPACITY MANAGEMENT IN A VIRTUALIZED COMPUTING ENVIRONMENT__

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing resource allocation in a virtualized computing environment and, more particularly, to a system and method for optimizing allocation of resources that are provided with global capacity across multiple hosts.

BACKGROUND

Global Capacity on Demand (Global CoD) refers to a scheme where computing resources are reserved in a set of host machines. The reserved resources are then designates for use by one or more customer. A customer may purchase a 'base license' for a portion of the resources on the host machines to support certain need for resources. In addition, a 'global license' for a certain amount of additional resources may be also purchased to support any further needs of the customer for resources.

The purchase of the combination of base and global licenses allows a customer some flexibility in its ability to satisfy expected and unexpected needs for resources at a reasonable cost. For example, a base license may be purchased for 4 of the 8 processors on a host machine. If there are 3 host machines, a global license may be purchased for 5 additional processors. In this scenario, 4 base license processors may be activated on each host regularly and up to a total of 5 additional processors can be activated at any given time across all 3 hosts, depending on customer needs.

A customer may utilize resources on a plurality (i.e., a cluster) of host machines. Known solutions for performance optimization of virtual machines (VMs) that run on a cluster of hosts do not take into account the optimization potentials for dynamic manipulation of global capacity discussed above. For example, if a VM running on a first host is expected to over-utilize the resources on the first host, typically, the VM is migrated to a second host with more available resources. However, VM migration can be very costly and should be delayed or avoided where less expensive options are available.

Licensing aspects and optimization potentials of virtual processors per VM and constructs like shared processor pools (SPPs) may help more efficiently address the costs associated with resource allocation over a cluster of hosts. For example, one or more VMs on a host can be restricted to an SPP that includes a logical pool of processors defined on the host. It is desirable to manage the SPP size for the host, such that processor value unit (PVU) budget is not exceeded for an application. Unfortunately, however, the trade-off between PVU goals (i.e., VM consolidation) and performance goals is often difficult for the system administrator to manage.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for managing resources allocated in a virtualized computing network are provided. The method comprises monitoring resource usage by a first host in a virtualized computing network, wherein the first host, in addition to the first host's dedicated resources, has access to a first set of sharable resources allocated for use by the first host, and wherein the second host, in addition to the second host's dedicated resources, has access to a second set of sharable resources allocated for use by the second host; determining whether the second host has excess resource capacity in the second host's dedicated and sharable resources, in response to determining that resource usage of the first host in the first host's dedicated and sharable resources has exceeded a resource usage threshold; and reallocating one or more resources in the second set of sharable resources from the second host to the first host, in response to determining that the second host has excess resource capacity.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
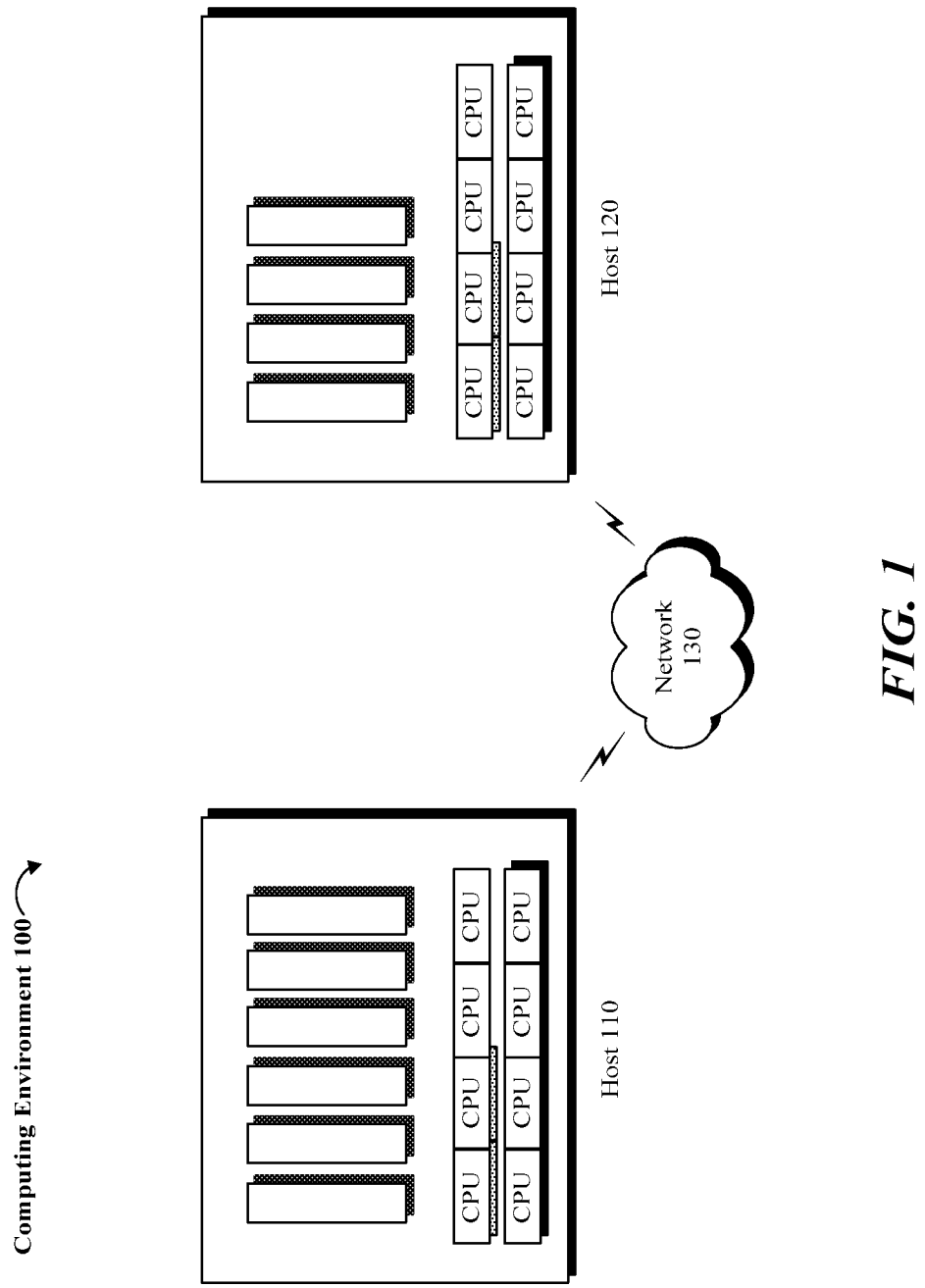
FIG. 1 illustrates an exemplary computing environment in accordance with one or more embodiments, wherein a plurality of hosts share resources that are globally allocated.

Referring to FIG. 1, systems and methods are provided for optimizing resource allocation in a virtualized computing network 130. In an example embodiment, resources (e.g., CPU, memory, disk space, etc.) are shared among a plurality of virtual machines that run on multiple hosts with limited amount of resources. As shown, hosts 110,120 may have 8 CPUs each. A customer may have a base license to use 4 of the 8 CPUs on a fixed term and a global license to use up to additional 4 CPUs over a cluster of hosts. This would mean that the customer may, for example, use 4 base CPUs on hosts 110,120 and further use 4 additional global CPUs on either the first host 110, or a second host 120, or a combination of the first and second hosts.

As shown in FIG. 1, the customer may have 10 VMs (as represented by vertical bars) running, with 6 VMs on the first host 110 and 4 VMs on the second host 120. Out of the 8 CPUs in each host, each host may have 4 base CPUs and 2 global CPUs active. If the 6 VMs on the first host 110 utilize the 4 base CPUs and the 2 global CPUs on the first host 110, up to a predefined use threshold, then one option is to migrate one or more VMs from the first host 110 to a second host 120 that has excess CPU capacity. However, VM migration is expensive because the state of the VMs and the related operations have to be saved and transferred to the second host 120. Instead, by reallocating resources between the hosts, the first host 110 may activate one of its globally licensed CPUs to provide additional resources to the VMs.

Figure 2:
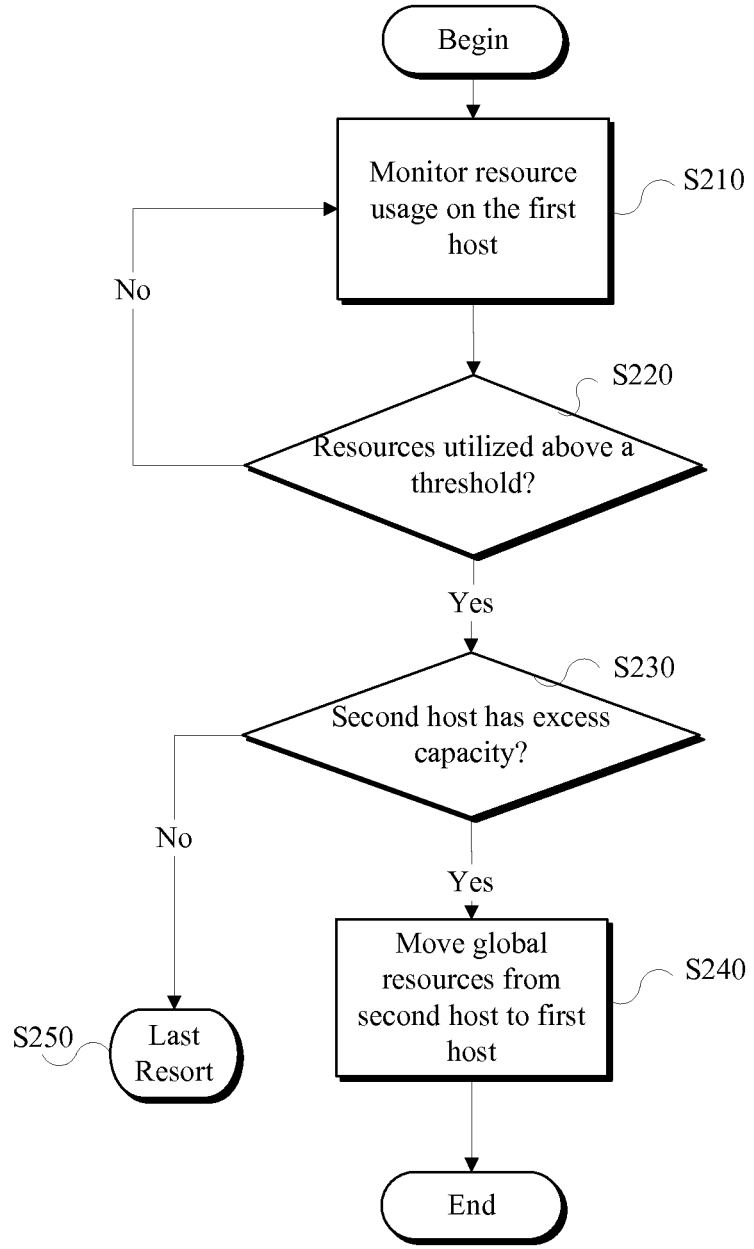
FIG. 2 is an exemplary flow diagram of a method of sharing globally allocated resources, in accordance with one embodiment.

In the above example, additional CPU resources may be needed on the first host 110 to accommodate the 6 VMs that are using the current CPU resources (i.e., 4 base CPUs and 2 global CPUs) near or beyond max capacity. Referring to FIG. 2, first host 110 resource usage may be monitored (S210) to determine if one or more resources on the first host are utilized beyond a threshold (S220). If so, then it is determined whether a second host 120 has excess capacity (S230). If excess capacity exists, then one or more global resources (e.g., one or more CPUs) in the second host 120 may be deactivated and one or more global resources on the first host may be activated (S240). The number of CPUs that are activated or deactivated may be controlled based on limitation or parameters that are defined by the number of licenses a customer holds for global resources, for example.

In the above scenario, after the deactivation of a global CPU in the second host 120 and activation of a global CPU in the first host 110, the first host 110 will have a total of 7 active CPUs (4 base CPUs plus 3 global CPUs) and the second host 120 will have a total of 5 active CPUs (4 base CPUs plus 1 global CPU). If after monitoring the CPU resources, it is determined that the 6 VMs on the first host 110 have utilized both the 4 base CPUs and the 3 global CPUs on the first host 110 to maximum capacity (i.e., there is no excess capacity), then another option (e.g., a last resort option) may be selected (S250). For example, the second host 120 may not be able to adequately support the VMs running on the second host 120, if the second host 120 has to give up additional CPU resources. In such a scenario, a VM migration may be the last resort option, if the first host cannot borrow another global CPU from a third host (not shown).

As such, if borrowing of additional resources is not an option, then the first host 110 would arrange for one or more of the 6 VMs running on the first host 110 to be migrated to the second host 120. It is noteworthy that in the above examples for the purpose of simplicity and brevity a system with two hosts is discussed with limited detail. In systems where a larger number of hosts are available in a cluster of hosts, a more extensive search for resources and available borrowing capacity, based on global optimization aspects, may be implemented. Furthermore, while the above examples are related to borrowing or sharing CPU capacity, the same concepts may extend to borrowing or sharing other types of computing resources, such as memory or disk storage resources.

As provided in further detail below, allocation of resources between hosts may be accomplished by way of different means, such as capacity borrowing or global application processor value unit (PVU) licensing. Capacity borrowing refers to allowing a host machine to borrow a resource from another host. Global application PVU licensing refers to a scheme where a customer purchases a global license for application reflecting a global CPU power allowable for the application. In one example embodiment, a sharable resource may be a vCPU. A vCPU is defined as allocation of CPU resources (e.g., based on timesharing) so that a single CPU may be shared among multiple applications or VMs.

By way of an illustrative detailed but non-limiting example, assume that the customer has a host with 4 CPUs and runs a DB2 application in virtual machines on the host, and that each VM is allocated 2 vCPUs. Running a single VM would require PVU licensing of 2 vCPU (since it can use at most 2 CPUs). Running 3 VMs would require PVU licensing of 4 vCPUs (since the host has 4 CPUs). In this example, a VM may be allocated a limited number of vCPUs on a host. For example, a VM may be allocated 2 vCPUs. The vCPUs may be allocated to the VMs that run DB2 in a way that the global DB2 PVU licensing purchased by the customer is not violated.

It is noteworthy that the vCPU example above is in the context where the global resource is an application license—e.g., a customer has a global DB2 license of 7 CPUs. If the customer has 2 VMs that run DB2, one with 3 vCPUs and one with 4 vCPUs, the customer will be fine with the global license, because at the maximum a vCPU will be mapped to a full CPU, with 7 CPUs running DB2. If the 2 VMs are placed in a host with 4 activated CPUs, this would be considered as consuming 4 DB2 CPU licenses and not 7, since in this case 4 CPUs are running DB2 (and a vCPU will get a portion of a CPU). Same would be true if the 2 VMs are restricted to run in a SPP of size 4 CPUs on a host.

As such, if a first VM and a second VM are on the first host 110, one vCPU allocated to the first VM may be allocated to the second VM, if it is determined that the second VM needs more processing power than the first VM on the first host 110. In a similar manner, a vCPU may be allocated to a VM running on the second host 120, if the solution of a constraint satisfaction problem taking into account the global resources for the hosts indicates that such allocation is proper. It is noteworthy that in the above scenario, if the vCPU on a VM on the first host 110 is reallocated to a VM on the second host 120, then that may result in the deactivation of a processor on the first host 110 and activation of a processor on the second host 120, within the licensing provisions of the customer.

In one implementation, where a shareable resource is memory, a first host 110 may share memory allocated to the first host 110 with a second host 120. This may be performed by deallocating a certain amount of memory from the first host 110, as needed, and allocating that memory to the second host 120. An example in which the method disclosed above may be applicable to memory sharing among hosts in a cluster is remote memory by remote direct memory access (RDMA). In this example, one host may borrow a portion of a memory from another host and access the memory through an RDMA interface.

It is noted that the allocation and deallocation of resources, regardless of the type of resource, may be configured to take place dynamically as the needs of the first and second host 120 changes overtime. The dynamic allocation may be managed and calculated according to a constraint satisfaction problem that receives as input the amount of resources available to the hosts, the resource consumption metrics of the running VMs, the global capacity of resources among the hosts, collocation constraints, licenses per customer, and other soft or hard constraints. The global capacity may be a measure of the borrowable or sharable resources (e.g., the aggregation of the resources on a host that may be borrowed by other hosts).

In the following, a more detailed discussion is provided to provide a better understanding of the above systems and methods and how such systems and methods may be used to accommodate the sharing or borrowing of resources with global capacity across a cluster of hosts. It is noteworthy, however, that the additional details provided below are by way of example and should not be construed to limit or narrow the scope of the claimed subject matter to the particular illustrative implementations.

In accordance with one example embodiment, an optimization framework may be provided that computes a desired placement of the virtual machines based on: the current placement of VMs, level of utilization of resources on the hosts, and optionally other real-time metrics. The optimization goal may be directed to optimizing performance, load balancing, energy efficiency, resource availability, etc. A resource placement solution may be configured to meet hard constraints while optimizing for the soft goals. An example optimization goal function may calculate a score for a potential target placement, such the placement with the best score may be selected. For the goal of load balancing, an element may be included in the optimization goal function that gives a negative score to high utilization of a host. For the goal of VM's demand satisfaction, there may be an element that gives a negative score to unsatisfied demand.

In one implementation, the number of assigned vCPUs may affect the ability to satisfy a VM's demand. For example, a VM with 2 vCPUs may get a maximum of 200% processing units of a CPU. To avoid too many VM relocations, the optimization goal function may include an element that gives a negative score to relocations that are required in order to get to the target placement from the current placement. The above optimization framework may include a solver engine (e.g., a Constraint Programming engine or Mixed Integer Programming engine) that given the model (which includes the optimization goal function), the current placement, the metric inputs and the constraints, computes the best target placement.

In accordance with one or more embodiments, the global capacity capabilities may be utilized to reallocate capacity between hosts in order to influence the score of the performance or load balancing goal of the optimization function. Depending on implementation, types of global capacity may be in form of CoD, capacity borrowing, or application PVU, for example. In one embodiment, global capacity may be utilized in cluster optimization, based on the following assumptions:

I. Global capacity for the resources and the borrowable resources of the hosts are known, so that there is a known number of total global-licenses in the cluster (e.g., representing the number of global-licenses purchased by the customer).

II. The underlying management framework enables the dynamic reallocation of global capacity: the global-license processors may be re-allocated (i.e. by activation and de-activation of processors), and borrowable resources of hosts may be allocated to other hosts.

III. A global PVU limit exists for an application in the cluster (e.g., representing the amount of PVU license purchased by a customer).

IV. A VM runs a single application and is marked by the application (e.g. "DB2").

V. For a VM, there is a specified minimum and maximum number of vCPUs.

VI. The underlying management framework enables the following operations:
Creation and resizing of SPPs,
Assigning of deployed VMs to SPPs,
Reallocating vCPUs for VMs.

In one implementation, a SPP may be created for a host for an application. When a VM is placed on a host, the VM may be placed in the SPP of the VM's application (e.g., pa DB2 VM may be placed in the DB2 SPP of the target host). There may be no incentive to place VMs of different applications in the same SPP because such placement may hurt the demand satisfaction without gaining any licensing benefit. The optimization goal function and problem model of the solver engine may be enriched as follows:

I. Small costs may be respectively associated with changing the allocation of global hardware resources (e.g., processors), SPP sizes and vCPUs numbers between the target placement and the current placement;

II. The load cost element of the placement optimization function may be extended to include the load cost of SPPs on hosts (in addition to the load costs of the hosts);

III. The output placement solution may be extended to include:

A. For a host the allocated global license hardware (e.g., number of activated processors which may be between 0 to min of either the non-base-license processors on the host or total global-licenses on the cluster);

B. For a host the allocated borrowed resources (e.g., including the loaning host for a borrowed resource);

C. A size for a SPP (0 to number of activated processors on the host), such that for an application, the global PVU constraint will be respected;

D. Number of vCPUs for a VM (e.g., defined between a specified minimum and maximum).

In the resulting placement solution, based on the optimization goal function, the solver engine may be driven to:

Allocate the global resource in a way that avoids high utilization on a host;

Reallocate the number of vCPUs in a VM to optimize the trade-off between VMs' demand satisfaction and SPPs or hosts load balancing, under the PVU limit constraints;

Make the SPP sizes as big as possible (e.g., up to the sum of the vCPUs of the contained VMs) without violating the PVU limits (e.g., to get less cost on the SPPs' load) and thus limiting or eliminating high utilization on a SPP.

In summary, due to the higher cost associated with VM relocations, VM relocation will be chosen as a last resort, after the global resource capacity, SPPs and VMs' vCPUs are optimized. Accordingly, a solution for performance optimization of virtual machines on a cluster of physical machines is provided with consideration and optimization of aspects of global capacity capabilities such that:

I. The global capacity capabilities are utilized to reallocate capacity between hosts in order to influence the score of the performance or load balancing goal of the optimization function, such that the relocation of capacity has a lower-cost associated with it than a VM relocation, so that VM relocation is performed as a last resort.

II. SPPs utilization is considered as part of the performance or load balancing goal of the optimization function, as applications running in virtual machines assigned to a SPP may suffer from bad performance if the SPP utilization is high, even if the host utilization is not high.

III. SPPs are dynamically resizing (while maintaining the applications PVU limitation) in order to influence the score of the performance or load balancing goal related to the SPPs (the global optimization goal function may be augmented with SPPs utilization as described above), and making the dynamic resizing associate with lower-cost than VM relocation, so that VM relocation is performed as a last resort.

IV. vCPUs are dynamically reallocated for VMs, where the allocation flexibility is between the minimum and maximum number specified for the VM. A fraction limit for processor units may be identified that may be assigned for a vCPU. For example, if the fraction limit is 10%, the total number of vCPUs in VMs on the host will not be greater than 10 times the number of CPUs).

The above methodologies provide the following advantages:

I. More efficient and quick response to high host utilization caused by application load bursts. For example, reallocating a global-license processor is a sub-second operation (de-activation on the source host and activation on the target host) that does not involve CPU and network overheads as VM relocation.

II. Better placement flexibility—e.g., extending beyond the traditional bin-packing problem (i.e., packing VMs each with minimal requirement on each resource, into cluster of hosts, each with given capacity for each resource), by way of dynamically resizing the bins by reallocating global resources or capacity borrowing.

III. Automated cluster-wide optimization of the global capacity capabilities (as CoD), providing a completely new dimension of resource (and recourse licensing) optimization to customers. Such implementation would push the cluster towards becoming a single large host in respect to certain resources.

IV. Automated management of SPPs and PVUs, assuring PVU conformance at all times.

V. Performance optimization that takes into account effect of high SPP utilization which can become a performance bottleneck.

VI. Automated cluster-wide optimization of the SPP capability and VM vCPUs allocation (maintaining the licensing constraints), providing a completely new dimension of resource and licensing optimization to customers.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
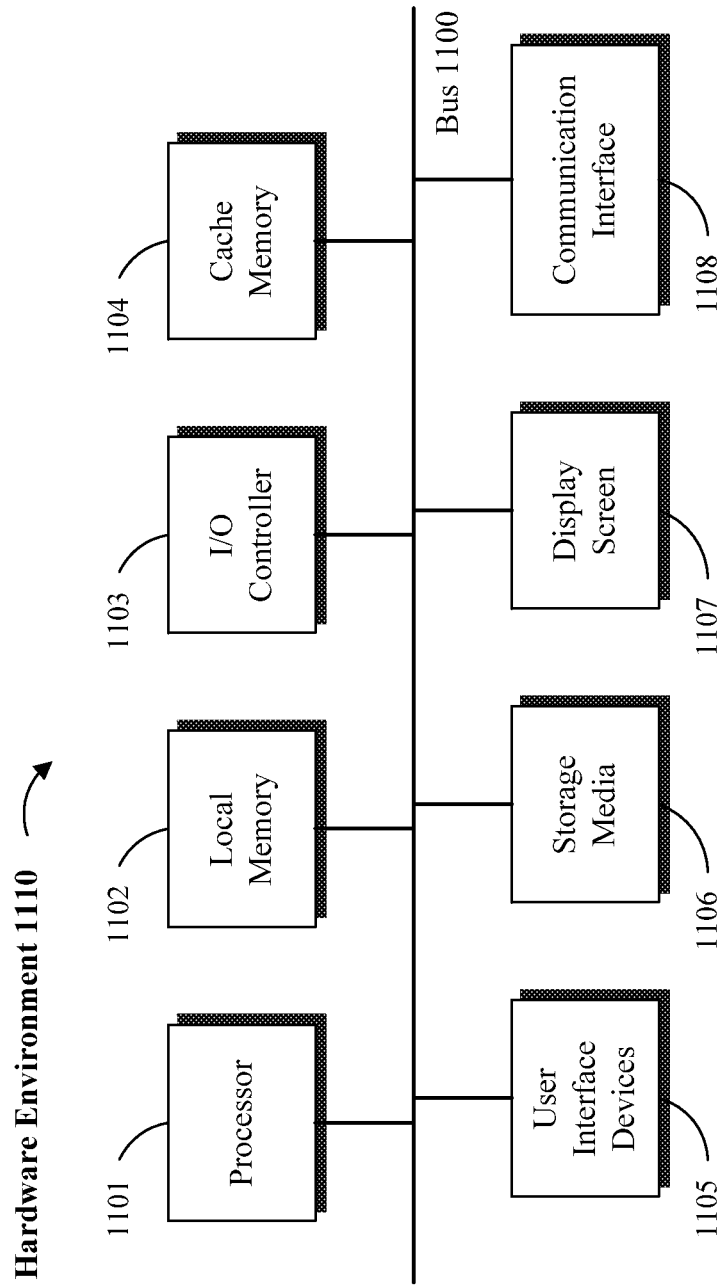
FIGS. 3 and 4 are block diagrams of hardware and software environments in which the disclosed systems and methods may operate, in accordance with one or more embodiments.
Figure 4:
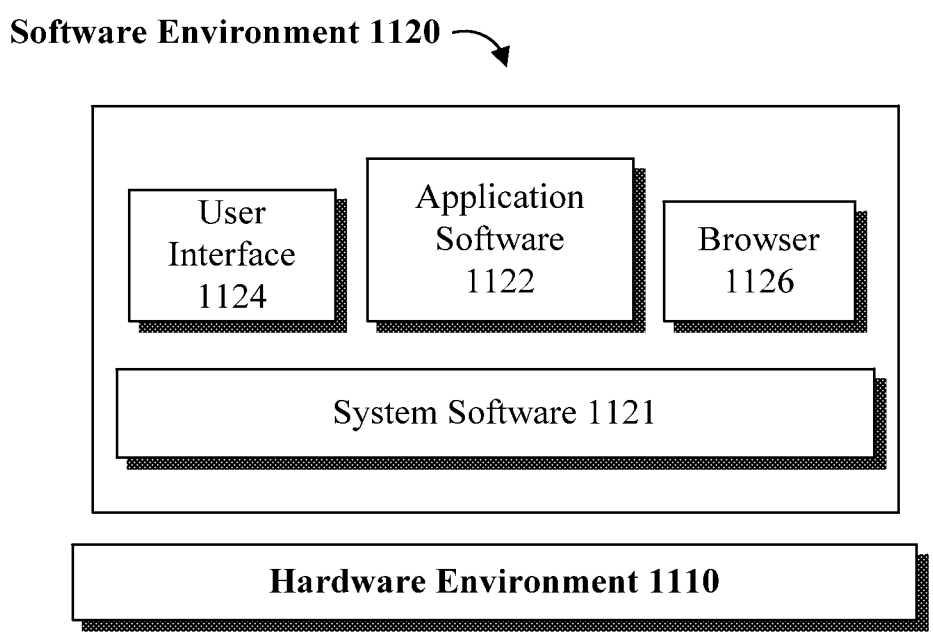

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for managing resources allocated in a virtualized computing network, the method comprising:
    identifying a first virtual machine (VM) running on a first host in the virtualized computing network, the first VM consuming a first amount of resources of the first host;
    identifying a second VM running on a second host in the virtualized computing network, the second VM consuming a second amount of resources of the second host;
    monitoring resource usage by the first host, wherein the first host, in addition to the first host's dedicated resources, has access to a first set of sharable resources allocated for use by the first host, and wherein the second host, in addition to the second host's dedicated resources, has access to a second set of sharable resources allocated for use by the second host;
    determining that the first VM is unable to remain on the first host based on the first amount of resources consumed and determining whether the second host has excess resource capacity in the second host's dedicated and sharable resources, in response to determining that resource usage of the first host in the first host's dedicated and sharable resources has exceeded a resource usage threshold;
    determining that reallocating one or more resources in the second set of sharable resources from the second host to the first host would allow the first VM to remain on the first host based on the first amount of resources consumed and would allow the second VM to remain on the second host based on the second amount of resources consumed;
    reallocating the one or more resources in the second set of sharable resources from the second host to the first host, in response to determining that the second host has excess resource capacity; and
    wherein in response to determining that the second host has no excess resource capacity, or that no sharable resources can be reallocated from the second host to the first host, one or more virtual machines running on the first host are migrated to another host in the virtualized computing network.

2. The method of claim 1, wherein in response to determining that the second host has no excess resource capacity, one or more sharable resources that are currently allocated to a third host in the virtualized computing network are reallocated to the first host, if it is determined that the third host has excess resource capacity.

3. The method of claim 1, wherein the first and second set of sharable resources comprise processor resources.

4. The method of claim 1, wherein the first and second set of sharable resources comprise data storage resources.

5. The method of claim 1, wherein the first and second set of sharable resources comprise processor value units (PVUs) per application.

6. The method of claim 5, wherein a global application PVU licensing allows the purchase of a global license for application, reflecting a global CPU power allowable for the application.

7. The method of claim 5, wherein amount of consumed PVU license is controlled by setting the number of vCPUs in one or more virtual machines.

8. The method of claim 5, wherein amount of consumed PVU license is controlled by restricting one or more virtual machines to run within a shared processor pool (SPP), and by controlling the size or number of CPUs of the SPP.

9. The method of claim 8 where the SPP's utilization is monitored and considered in optimization of resource usage to influence the decisions to reallocate sharable resources or to migrate virtual machines or to change SPPs' sizes.

* * * * *